(12) United States Patent
Sample et al.

(10) Patent No.: US 7,086,740 B2
(45) Date of Patent: Aug. 8, 2006

(54) INJECTION-MOLDED VENT SCREENS

(75) Inventors: Greg Sample, Newberg, OR (US);
Tony Rogers, Milwaukie, OR (US)

(73) Assignee: InFocus Corporation, Wilsonville, OR (US)

(*) Notice: Subject to any disclaimer, the term of this patent is extended or adjusted under 35 U.S.C. 154(b) by 78 days.

(21) Appl. No.: 10/860,552

(22) Filed: Jun. 2, 2004

(65) Prior Publication Data

US 2005/0001988 A1 Jan. 6, 2005

Related U.S. Application Data

(60) Provisional application No. 60/475,391, filed on Jun. 2, 2003.

(51) Int. Cl.
*G03B 21/16* (2006.01)
*G03B 21/18* (2006.01)
*G03B 21/24* (2006.01)
*G03B 21/14* (2006.01)
*F24F 13/06* (2006.01)

(52) U.S. Cl. ............... 353/52; 353/60; 353/61; 353/119; 454/309; 454/358; 454/367; 348/748

(58) Field of Classification Search ............... 353/52, 353/119, 60–61; 454/309, 358, 367; 348/748
See application file for complete search history.

(56) References Cited

U.S. PATENT DOCUMENTS

| | | | | |
|---|---|---|---|---|
| 2,703,045 A | * | 3/1955 | Gilbert et al. | 454/251 |
| 4,739,396 A | | 4/1988 | Hyatt | 348/751 |
| 4,976,753 A | * | 12/1990 | Huang | 96/58 |
| 6,139,154 A | * | 10/2000 | Haba | 353/31 |
| 6,398,367 B1 | * | 6/2002 | Watanabe | 353/98 |
| 6,508,704 B1 | * | 1/2003 | Wilson | 454/277 |
| 6,637,895 B1 | | 10/2003 | Fujimori et al. | 353/119 |

* cited by examiner

*Primary Examiner*—W. B. Perkey
*Assistant Examiner*—Magda Cruz
(74) *Attorney, Agent, or Firm*—Alleman Hall McCoy; Russell & Tuttle LLP

(57) ABSTRACT

A projection device is provided, wherein the projection device includes a casing, a plurality of electronic components mounted within the casing, a vent in the casing disposed substantially adjacent to an electronic component, and an injection molded, electrically nonconductive vent screen having one or more mesh portions substantially bordered by a peripheral frame, wherein the vent screen is detachably coupled within the casing and secured against the vent.

29 Claims, 3 Drawing Sheets

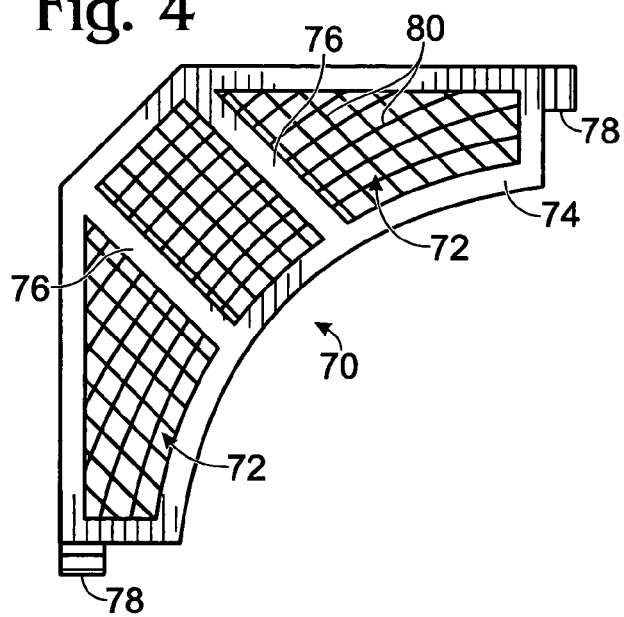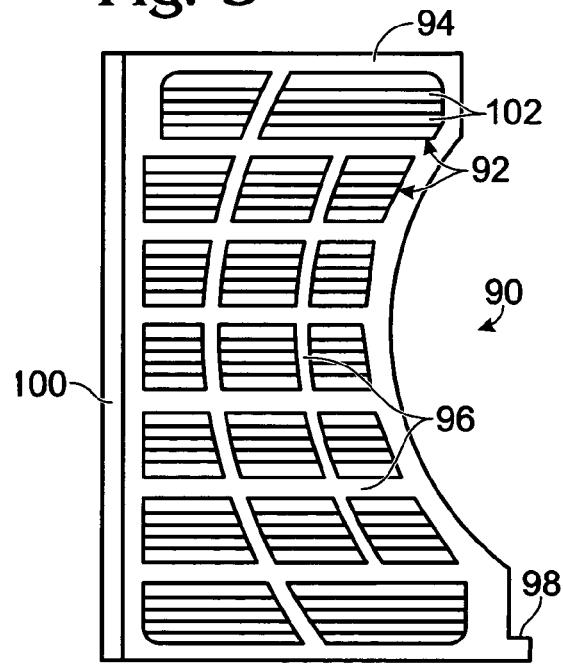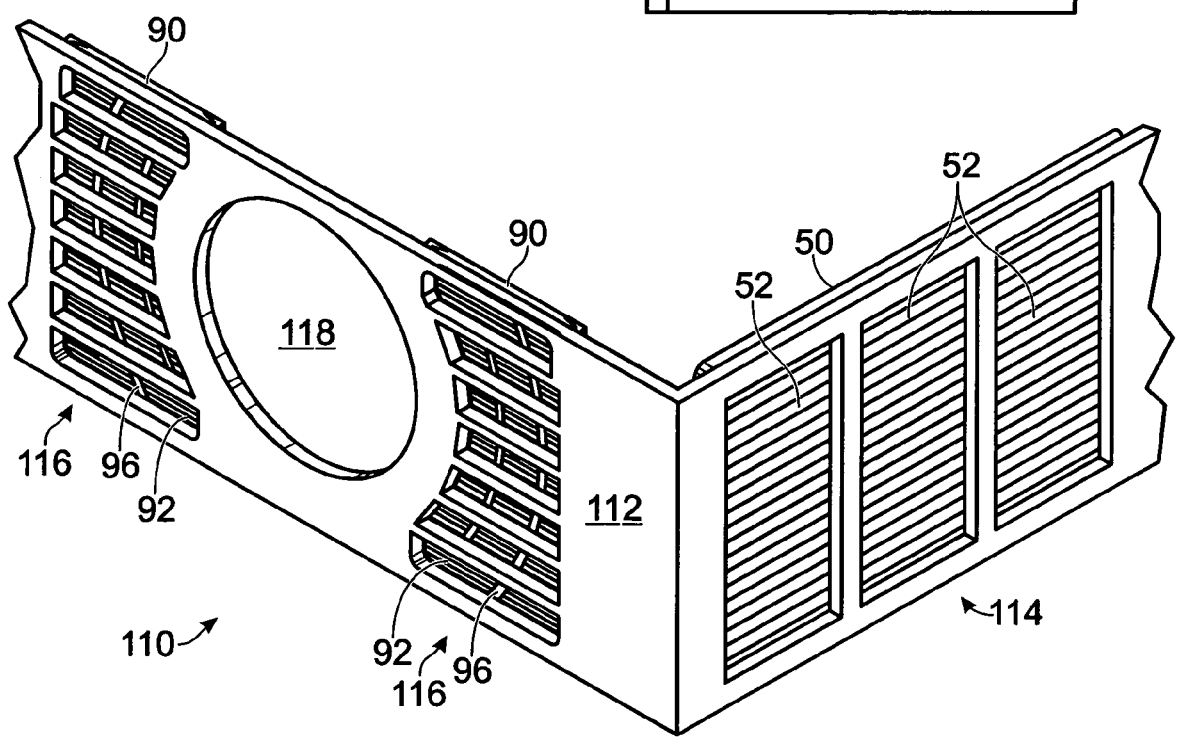

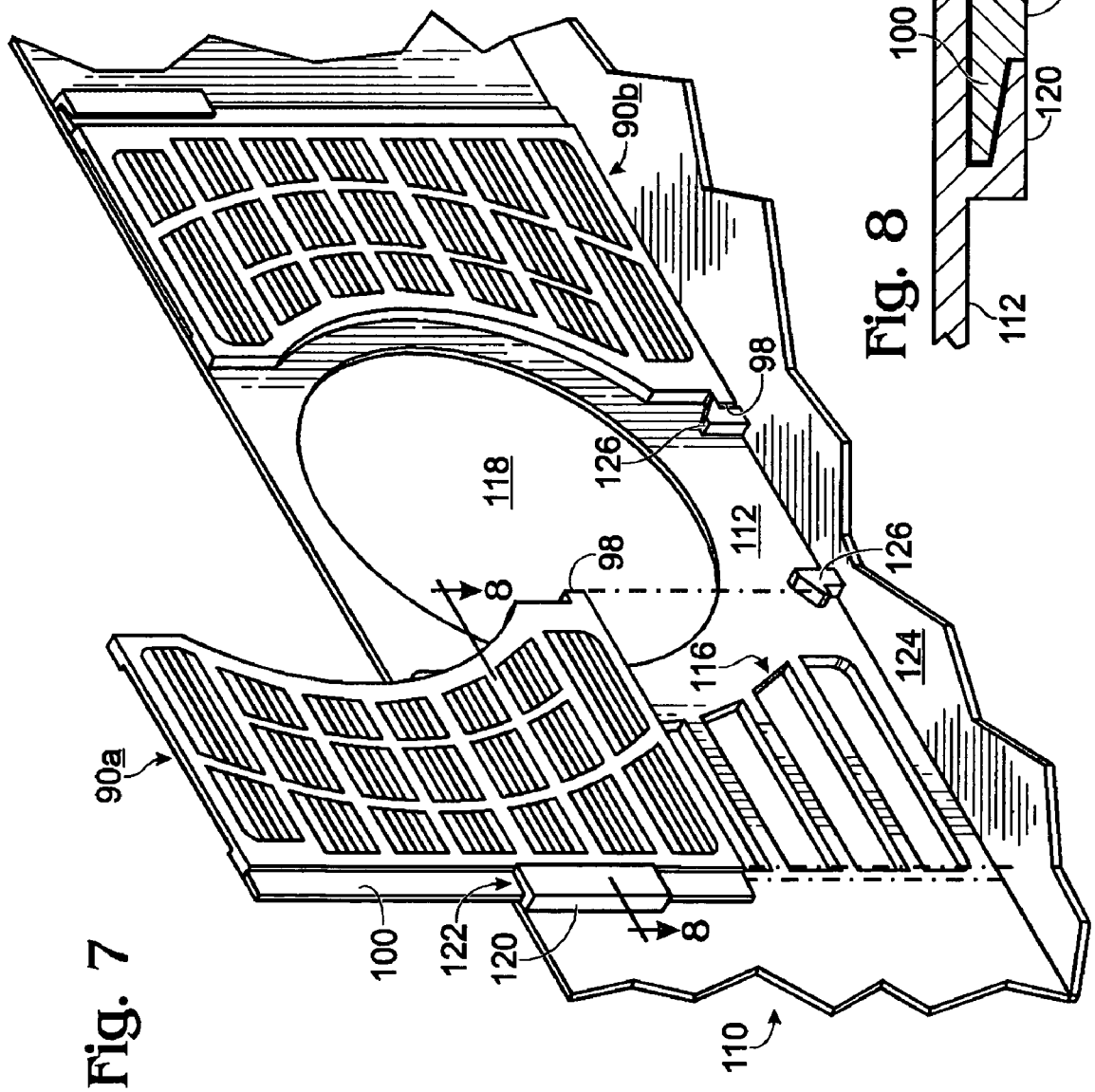

INJECTION-MOLDED VENT SCREENS

CROSS-REFERENCE TO RELATED APPLICATIONS

The present application claims priority under 35 U.S.C. § 119 to U.S. Provisional Patent Application Ser. No. 60/475,391, which was filed on Jun. 2, 2003. The disclosure of that application is hereby incorporated by reference in its entirety for all purposes.

TECHNICAL FIELD

The present disclosure relates generally to vent screens, and more specifically to injection molded, nonconductive vent screens for use in projection devices.

BRIEF DESCRIPTION OF THE DRAWINGS

The disclosure is illustrated by way of example and not by way of limitation in the figures of the accompanying drawings, in which the like references indicate similar elements and in which:

FIG. 4 is an elevation view of another embodiment of an injection-molded vent screen.

FIG. 5 is an elevation view of another embodiment of an injection-molded vent screen.

FIG. 6 is an isometric, exterior view of part of a casing for a projection device, showing the embodiments of FIGS. 2 and 5 positioned against vents in the casing.

FIG. 7 is an isometric view of an interior portion of the casing of FIG. 6, showing an exemplary structure for coupling an embodiment of an injection-molded vent screen with the casing.

FIG. 8 is a cross-sectional view of the vent and injection-molded vent screen of FIG. 7, taken along line 8—8 of FIG. 7.

DETAILED DESCRIPTION

In some embodiments, an electrically nonconductive vent screen is provided for use in a projection device. The vent screen may be injection molded to correspond in shape, size, and/or features to a vent or other opening in the projection device casing. The vent screen may further include retention and/or alignment features configured to retain and/or align the vent screen in a desired position within a device, such as against a vent in the projection device casing. Such retention and/or alignment features may be formed integrally with a vent screen, or separately fabricated and subsequently attached to a vent screen. Optionally, the casing of a projection device may include corresponding features adapted to engage the retention and/or alignment features of the vent screen, which may secure or detachably couple the vent screen in a desired position within the device.

Figure 1:
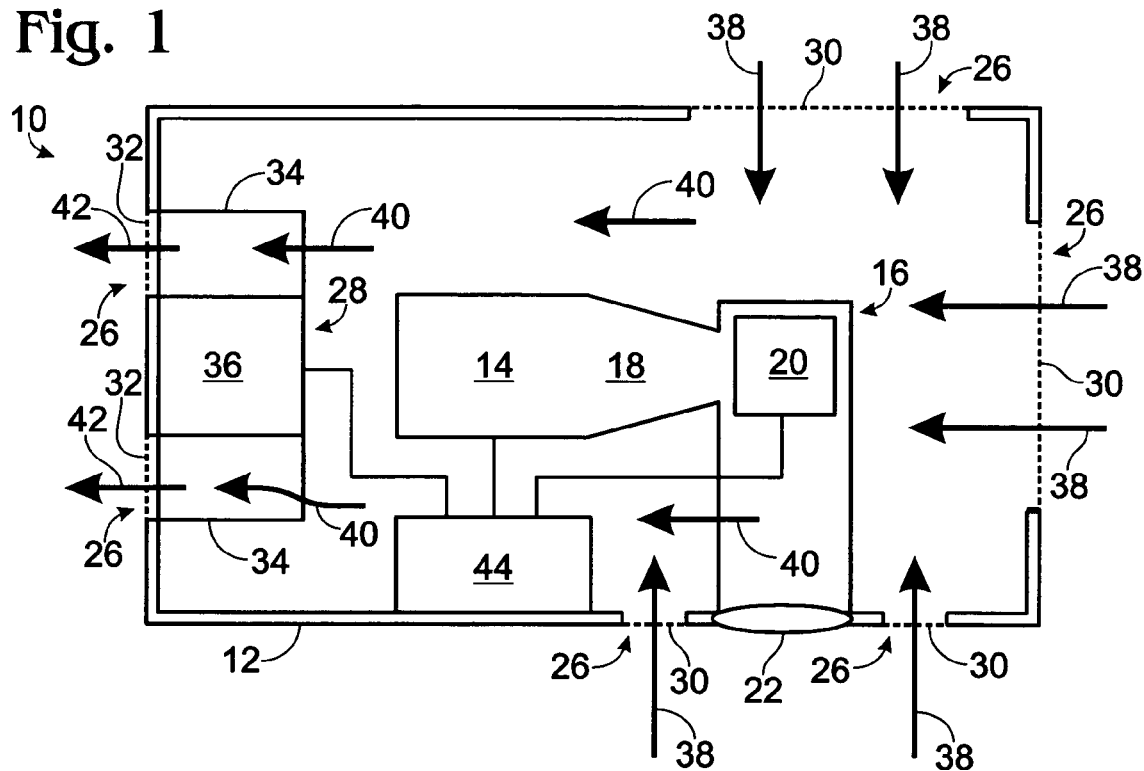
FIG. 1 is a schematic illustration of an embodiment of a projection device, including a power source positioned adjacent to a vent disposed in the casing of the projection device.

A projection device 10 is illustrated schematically in FIG. 1. Projection device 10 may be a projector adapted to project an image onto a display surface such as a screen, a wall, or other viewing surface or area. Projection device 10 may be any suitable display device or image projector including, but not limited to, a digital projector, a liquid crystal display (LCD) projector, a digital light processing projector, etc.

In some configurations, projection device 10 may include components mounted within a casing 12, such as a light source 14 and an optical engine (or light engine) 16. Light source 14 may be adapted to produce a beam of light and project the light toward optical engine 16, which may be configured to generate an image.

Light source 14 may include a lamp, such as a metal halide lamp or an ultra-high-pressure (UHP) arc lamp, positioned within a reflector, which may be configured to direct most of the emitted light along a predetermined path. For example, light emitted from light source 14 may be channeled through a spacer or interface tube 18, to the optical engine. The emitted light may also pass through one or more filters, such as an infrared (IR) or ultraviolet (UV) filter, to filter out unwanted parts of the emission spectra of the lamp.

Optical engine 16 may include optical elements such as filters, lenses, mirrors, condensers, and the like. Optical engine 16 may also include an image-producing element 20 such as a digital micromirror (DMD), an LCD panel, or any other suitable image source. Image-producing element 20 may be configured to project light toward one or more mirrors or other optics, such as a projection lens 22, which in turn may be configured to direct light toward a display surface.

Operation of light source 14 and other electronic components in projection device 10 may increase the temperature of the device during use. If the temperature of the device exceeds critical limits, portions of the device may malfunction and/or have a shorter life span. Maintaining temperatures within the device at operating levels thus may help to prevent the device from malfunctioning and/or increase the lifespan of components and parts.

Projection device 10 thus may include a plurality of vents, indicated generally at 26, disposed in casing 12. Vents 26 may allow ambient air to circulate through the device. Further, a blower 28 may draw ambient air into the projection device through one or more vents 26 and eject circulated air from other vents 26, thus helping to cool projection device components. Vents 26 may be arranged relative to blower 28 such that some vents are designated to be inlet vents (indicated at 30) and other vents are designated to be outlet vents (indicated at 32). Further, a vent, as described herein, may consist of one opening in the projection device casing, or may refer to a group or arrangement of more than one opening.

Blower 28 may include one or more blower portions 34, such as fans or similar air movers, powered by a blower motor 36. Thus, blower portions 34 may be configured to draw ambient air from outside projection device 10 through inlet vents 30 and into the projection device (indicated by arrows 38). The ambient air may then be drawn through projection device 10 and circulated around the various components within the projection device (indicated by arrows 40). Circulated air may be expelled from the projection device through outlet vents 32 (indicated by arrows 42).

Projection device 10 may further include a power source 44, linked to components such as light source 14, image producing element 20, blower motor 36, and/or other components such as a power circuit board (not shown), a control circuit board (not shown), and so forth, within the projection device. Some projection devices may include more than one power source disposed throughout within the casing. Moreover, in some projection devices, such as those having a compact design, one or more power sources may abut, or be mounted substantially adjacent to, one or more vents. For example, power source 44 in FIG. 1 is shown positioned adjacent to one of inlet vents 30.

Vents 26, and more specifically inlet vents 30, may be fitted with a vent screen that may allow air to pass through the casing to the internal portion of the device. A vent screen may be configured to direct airflow, to control the amount of airflow, and/or to protect components of the device by preventing objects from being inserted into the device through an opening.

Some projection devices may include a metal or metal-based wire mesh screen, which may be pressed into openings in the casing of a projection device and/or secured with screws or other fastening devices, to provide a screen for an inlet vent. However, such screens may be difficult to position and secure, especially in projection devices having a compact design. Moreover, such screens and fastening devices may be electrically conductive, which could disturb operation of one or more electronic components close to such a screen. For example, operation of the power source, when disposed too closely to a conductive vent screen, could result in electricity arcing between the power source and the vent screen, potentially damaging the projection device. For this reason, UL standards may require specific minimum spacings between electronic components and conductive vent screens.

Vent screens fabricated from electrically nonconductive materials, such as many resins, plastics, and other polymers, may be used without risk of power arcing between the power source and vent screen, even when used in close proximity with the power source or other electronic components. Nonconductive vent screens may therefore be placed substantially closer to a power source or powered component than conductive vent screens; i.e. closer than would be allowed under UL standards for electrically conductive vent screens. This may allow simpler design and production of compact and ultra-compact projection device in which high-power components, such as power supplies for lamps, blowers, etc., are in close proximity to the vent screens simply due to the small size of the projection device.

In some embodiments, nonconductive vent screens may be injection molded. Injection molding is a manufacturing process where a flowable material is injected into a mold cavity under pressure. After injection, the flowable material is cured or otherwise hardened resulting in the production of the desired part. Thus, since a mold cavity may be shaped as desired, injection molded vent screens may be fabricated in any desired configuration, and/or provided with integrally formed retention features, which in turn may facilitate positioning and/or securing such vent screens in place. Injection molding may further allow customization of the color of the vent screen, such as by adding a dye or coloring agent to the flowable material prior to curing.

Figure 2:
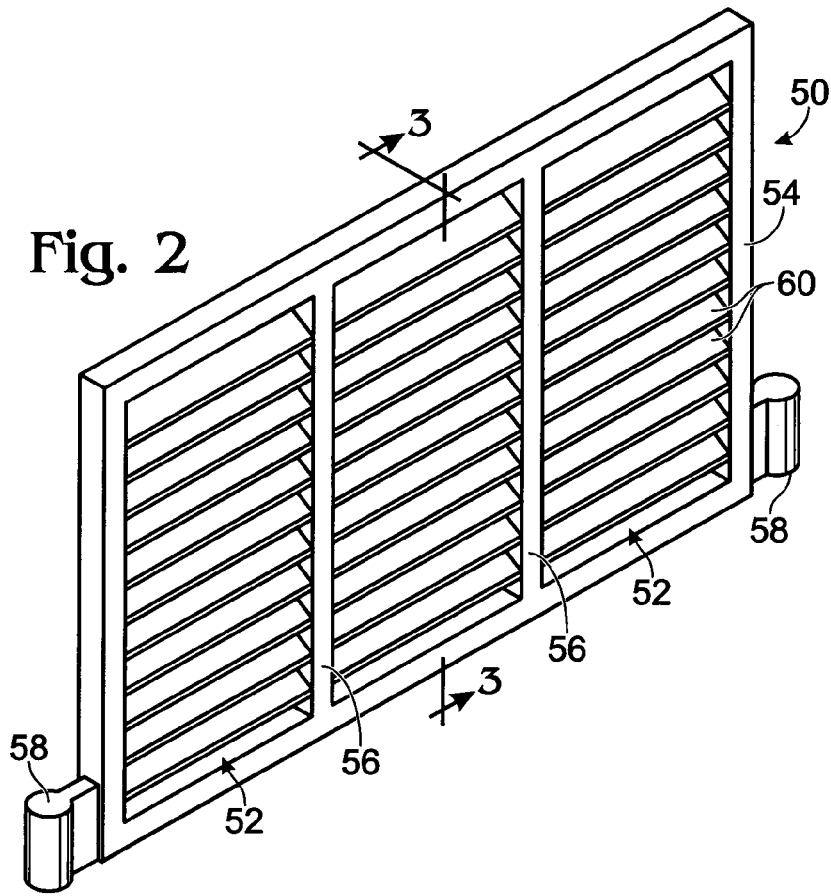
FIG. 2 is an isometric view of an embodiment of an injection-molded vent screen.

FIG. 2 illustrates an exemplary embodiment of an injection molded vent screen 50. Vent screen 50 may have a plurality of substantially planar mesh portions 52, surrounded by a peripheral frame 54 and separated by vertically disposed ribs 56. Integrally formed retention features 58 may extend outwardly from frame 54 and optionally may be configured to engage corresponding features in casing 12 at the point of attachment.

Figure 3:
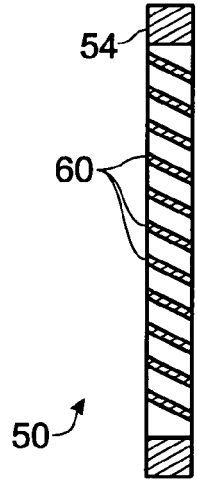
FIG. 3 is a cross-sectional view of the injection molded vent screen of FIG. 2, taken along line 3—3 of FIG. 2.

Mesh portions 52 may each include a plurality of parallel, horizontal slats 60, as shown in FIG. 2, or other similar structure such as struts, rods, and so forth, arranged in a desired mesh pattern. As can also be seen in FIG. 3, slats 60 may be oriented at an incline with respect to a vertical axis of vent screen 50. Some embodiments may feature slats spaced and/or oriented differently from those depicted. Injection molding may enable precise control of characteristics of the mesh pattern such as cross-sectional shape of the slats or similar structure, thickness, position, orientation, and so forth. Thus, the mesh portions may be customized for a desired application or product.

The mesh pattern or patterns of each mesh portion may be configured as desired, such as to allow and/or direct airflow. For example, FIGS. 4 and 5 show embodiments of vent screens with different configurations of mesh portions. Specifically, FIG. 4 depicts a vent screen 70 having mesh portions 72 with a plurality of intersecting straight and curved struts 80. FIG. 5 depicts a vent screen 90 having mesh portions 92 with a plurality of horizontally disposed slats 102.

Any mesh configuration or pattern may be achieved within injection molding parameters for a specified resin type, part size, thickness, etc. For example, in some embodiments, horizontal slats or vertical slats may be preferred. Injection molding enables manipulation of the size and position of slats or other features of the mesh pattern for optimal and/or desired ventilation. For example, horizontal slats may block some air flow in some devices, while vertical slats may allow more air through, for example, at the outflow of a wheel-style blower fan.

Any suitable nonconductive, flowable material may be Used. The flow rate of the material may be a factor used to select a desired material for injection molded screens. One exemplary material is Nylon 66, which has a relatively high flow rate, which may enable the material to flow more easily into small spaces in a mold cavity, such as those corresponding to mesh portions 52. The UL ratings, certifications, color, mechanical/thermal & electrical resin properties, colorability, etc., may further be properties affecting the selection of various materials for use in the injection molding process.

Rigidity may also be a factor in the selection of a suitable material for injection molding a vent screen. Optionally, a vent screen may be provided with structural features to stiffen the vent screen, if desired. For example, frame 54 may substantially stiffen vent screen 50 such that no additional processing of the screen is required prior to assembly within a projection device. Ribs may also add structural stability to a vent screen, as can be seen, for example, with ribs 76 of vent screen 70

Further, although vent screens 50, 70, and 90 are depicted as being generally planar, other embodiments of nonplanar and/or irregularly shaped vent screens may be injection molded and similarly provided with a peripheral frame and/or internal ribs to add stability and to resist deformation of the fabricated shape.

Moreover, the injection molding process may be aided by addition of a perimeter frame around the mesh portions, and/or ribs between some mesh portions, by ensuring that material flows through the entire mold.

Frame 54 may be of any shape, such that a vent screen may be customized for a specific application and/or for cosmetic purposes. For example, the frame may be rounded, curved, circular, angular, etc. Vent screen 70 is shown in FIG. 4 to include a frame 74 having both straight and curved portions. Similarly, vent screen 90 is shown in FIG. 5 to include a frame 94 having straight and curved portions. Such configurations may be used to fit around a curved opening, such as for a projection lens.

Ribs 56 also may be selectively molded in any desired pattern, and may optionally be configured in a desired shape for cosmetic purposes, as can be seen, for example, with horizontal and curved ribs 96 of vent screen 90. Such a configuration may mirror or substantially follow the shape of the exterior casing of the projection device and/or vent pattern, such as for cosmetic purposes.

For example, FIG. 6 shows an exterior view of part of an embodiment of a projection device 110 having a casing 112, into which vent screens 50 and 90 have been placed. Casing 112 may include generally rectangular vent 114, and may also include shaped vents 116. As can be seen, vents 114 and 116 consist of arrangements of several separate openings. Specifically, vent 114 consists of three substantially rectangular openings. Each of vents 116 consist of several irregularly-shaped openings collectively shaped to follow the contours of a generally circular opening 118, which may be adapted to accommodate a projection lens.

Some vents, as well as the shape and placement of the frame and ribs of some vent screens, may be configured such that portions of the vent screen are hidden from external view when installed in a projection device, while other portions are visible from the exterior of the device. For example, the size and shape of vents 114 may reveal mesh portions 52 of vent screen 50, while hiding ribs 56 (not shown). The size and shape of vents 116 may hide horizontally disposed ribs 96 (not shown), while revealing parts of curved rides and mesh portions 92.

As mentioned above, injection molding may enable integration of additional containment or assembly features with vent screens. For example, a mold cavity may be configured to provide a vent screen with retention features, such as retention features 58 of vent screen 50 (as shown in FIG. 2), which may resemble cylindrical posts. Other retention features, including posts, pins, projections, holes, studs, lips, tabs, detects, ridges, and so forth, may be injection molded such that the injection features are integral to the screen. For example, vent screen 70 may include retention features 78 in the form of tabs (as shown in FIG. 4). Similarly, vent screen 90 may include a retention feature 98 in the form of a tab (as shown in FIG. 5).

A mold cavity optionally may be configured to provide a vent screen with alignment parts and/or features adapted to engage corresponding features in the casing, to secure the vent screen in a desired and/or properly oriented position, such as against an opening or vent in the casing. For example, vent screen 90 may include a tenon, flange, or similar feature 100 protruding from one side of frame 94, which may properly align vent screen 90 in a desired position. Optionally, retention features may be configured to both retain and align a vent screen in a desired position. Flange 100 thus may allow vent screen 90 to be dovetailed to a mating surface, such as may be provided on a casing of a projection device.

FIG. 7 shows an interior view of part of an embodiment of a projection device 110 having a casing 112, which may include features configured to align and/or retain a vent screen, such as vent screen 90. For example, casing 112 may include a mating surface adapted to receive flange 100 of vent screen 90, to properly align vent screen 90 against casing 112. Specifically, a mating surface may be provided by a coupling structure 120 configured to form a mortise, groove, or similar feature 122. Vent screen 90a may thus slide within groove 122, as illustrated in FIG. 7. A floor 124, or stop, or other interior surface, may limit the amount vent screen 90a may slide within groove 122.

Casing 112 may include a complementary connecting feature, such as a latch 126, extending upwardly from floor 124, which may be configured to receive tab 98 of vent screen 90. Latch 126 may be adapted to detachably retain vent screen 90 in a desired position, such as against vent 116. Vent screen 90b is shown retained in such a desired position, with latch 126 engaging tab 98.

The use of an aligning mechanism and a latch mechanism as described may collectively ensure proper alignment and retention of parts and assemblies within the projection device. Optionally, an aligning mechanism alone, such as a dovetail joint, may be adapted provide a mechanical interlock between the injection molded screen or other component and the mating surface. The use of such retention and/or alignment features may decrease the likelihood of part deformation over time and may provide space for other components.

Moreover, such features may provide means of retention for parts and assemblies such that no additional fasteners are necessary. The elimination of additional fasteners may eliminate some of the labor cost and time in positioning a part and securing the part in place and may decrease the weight of the overall device. Moreover, since injection-molded retention features may be used to mate the screen with the casing of the projection device, no conductive fasteners need be used in the vicinity of the power supply.

Although a dovetail mechanism is described in relationship to an injection-molded screen, other types of components may be molded or cast to engage a corresponding mating surface. Moreover, the use of injection molding to fabricate nonconductive screens, including injection molding of retention features, may be used for inlet screens as well as other types of screens and components, including speaker screens/grills, etc.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A projection device, comprising:
   a casing;
   a plurality of electronic components mounted within the casing;
   a vent in the casing disposed substantially adjacent to an electronic component; and
   an injection molded, electrically nonconductive vent screen having one or more mesh portions substantially bordered by a peripheral frame;
   wherein the vent screen is detachably coupled within the casing and secured against the vent.

2. The projection device of claim 1, wherein the electronic component is a power source.

3. The projection device of claim 1, wherein the vent screen includes an integrally formed retention device.

4. The projection device of claim 3, wherein the retention device is adapted to align the vent screen relative to the casing.

5. The projection device of claim 4, wherein the casing includes a retention feature adapted to engage the retention device of the vent screen.

6. The projection device of claim 5, wherein the retention device includes a flange and the retention feature includes a groove configured to accept the flange.

7. The projection device of claim 5, wherein the retention device and the retention feature form a dovetail joint.

8. The projection device of claim 4, wherein the retention device includes a tab and the retention feature includes a latch.

9. The projection device of claim 3, wherein the casing includes a retention feature adapted to engage the retention device of the vent screen.

10. The projection device of claim 3, wherein the retention device is disposed on the peripheral frame.

11. The projection device of claim 1, wherein at least a part of the frame is not visible from the exterior of the projection device when the vent screen is secured against the vent, and wherein at least a part of the mesh portions are visible from the exterior of the projection device when the vent screen is secured against the vent.

12. The projection device of claim 11, wherein the frame is substantially obscured from view from the exterior of the projection device when the vent screen is secured against the vent.

13. The projection device of claim 1, wherein the vent screen further includes a rib interposed between two mesh portions.

14. The projection device of claim 13, wherein at least a part of the frame and at least a part of the rib are not visible from the exterior of the projection device when the vent screen is secured against the vent, and wherein at least a part of the mesh portions are visible from the exterior of the projection device when the vent screen is secured against the vent.

15. The projection device of claim 1, wherein the vent screen further includes a plurality of ribs, each interposed between two mesh portions.

16. The projection device of claim 15, wherein at least one rib is substantially obscured from view from the exterior of the projection device when the vent screen is secured against the vent, and wherein at least a part of the mesh portions are visible from the exterior of the projection device when the vent screen is secured against the vent.

17. The projection device of claim 1, wherein the vent is an inlet vent.

18. The projection device of claim 1, wherein the vent screen is fabricated of Nylon 66.

19. A projection device, comprising:
a casing having a vent; and
an electrically nonconductive vent screen configured to fit within the casing against the vent, the vent screen further including:
a plurality of substantially coplanar mesh portions;
at least one rib, each rib disposed between and separating two adjacent mesh portions; and
a frame disposed at the periphery of the plurality of mesh portions;
wherein at least a portion of the vent screen is not visible through the vent from the exterior of the casing.

20. The projection device of claim 19, wherein the frame is substantially obscured from view through the vent from the exterior of the casing.

21. The projection device of claim 20, wherein the at least one rib is not visible through the vent from the exterior of the casing.

22. The projection device of claim 20, wherein at least a portion of the at least one rib is not visible through the vent from the exterior of the casing.

23. The projection device of claim 20, wherein the vent screen is positioned substantially close to a powered component within the projection device.

24. A nonconductive vent screen for use in a projection device, comprising:
a substantially planar mesh portion adapted to direct air through the vent screen;
a frame disposed around the periphery of the mesh portion; and
an aligning mechanism including a dovetail joint adapted to provide a mechanical interlock between the screen and a mating surface.

25. The vent screen of claim 24, wherein the mesh portion, the frame, and the alignment device are integrally formed.

26. The vent screen of claim 24, wherein the vent screen including the frame and the alignment device is injection molded.

27. The vent screen of claim 24, further comprising a plurality of substantially planar mesh portions and at least one rib, wherein each of the at least one rib is interposed between two mesh portions.

28. The vent screen of claim 24, further comprising a retention device, wherein the retention device is configured to engage a corresponding feature in the projection device.

29. The vent screen of claim 24 wherein the aligning mechanism slidably engages the mating surface.

* * * * *